United States Patent [19]

Funk

[11] 4,437,977
[45] Mar. 20, 1984

[54] CONTROL OF A CATALYTIC CRACKING UNIT

[75] Inventor: Gary L. Funk, Bartlesville, Okla.

[73] Assignee: Phillips Petroleum Company, Bartlesville, Okla.

[21] Appl. No.: 427,260

[22] Filed: Sep. 29, 1982

[51] Int. Cl.³ .................... B01J 8/26; C10G 11/18
[52] U.S. Cl. .................. 208/113; 208/DIG. 1; 208/163; 422/105; 422/139
[58] Field of Search .............. 208/DIG. 1, 113, 164, 208/163; 422/139, 144, 105

[56] References Cited

U.S. PATENT DOCUMENTS

| | | | |
|---|---|---|---|
| 3,175,968 | 3/1965 | Berger | 208/164 |
| 3,213,014 | 10/1965 | Atkinson et al. | 208/113 |
| 3,316,170 | 4/1967 | Stewart et al. | 208/164 |
| 3,769,203 | 10/1973 | Lee et al. | 208/164 |
| 4,345,993 | 8/1982 | Stewart | 208/164 |
| 4,350,569 | 9/1982 | Furr | 203/2 |
| 4,367,121 | 1/1983 | Furr | 203/2 |

Primary Examiner—Delbert E. Gantz
Assistant Examiner—O. Chaudhuri

[57] ABSTRACT

In a catalytic cracking unit, the amount of the products removed from the fractionator associated with the catalytic cracking unit which has a boiling point above the highest boiling point of the desired product is calculated based on internal reflux to vapor ratios in various portions of the fractionator. The conversion of the catalytic cracking unit (the amount of the feed to the reactor having a boiling point above the highest boiling point of the desired product which is converted to a product having a boiling point below the highest boiling point of the desired product) is then determined and the reactor is controlled so as to maintain the actual conversion substantially equal to a desired conversion.

16 Claims, 6 Drawing Figures

CONTROL OF A CATALYTIC CRACKING UNIT

This invention relates to control of a catalytic cracking unit (CCU). In one aspect this invention relates to method and apparatus for maintaining a desired feed conversion for a catalytic cracking unit.

A CCU is generally made up of a reactor and a fractionator plus associated equipment. The most common type of catalytic cracking unit is a fluid catalytic cracking unit (FCCU) which also incorporates a catalyst regenerator. A CCU is commonly used to crack a feedstock, such as gas oil, into lighter products such as gasoline.

A principal factor which affects the economic viability of a catalytic cracking process is the amount of the feedstock which is converted to the desired product such as gasoline. This is generally referred to as the feed conversion where conversion is defined as $$\text{Conversion} = \frac{\text{Total Feed} - \text{Total Secondary Product}}{\text{Total Feed}}$$

where Total Feed equals the total volume of feed supplied to the reactor per unit time which has a boiling point greater than the highest boiling point of the desired product and Total Secondary Product equals the volume of the products, having a boiling point higher than the highest boiling point of the desired product, withdrawn from the fractionator per unit time.

It is generally very difficult to maintain accurate control of conversion in a CCU. Previous attempts to maintain a desired conversion have relied on analysis of the products removed from the fractionator. However, such analysis are very expensive and the analyzers are very difficult to maintain. Because of this, an analysis of the products removed from the fractionator is often not available.

When analysis of the products removed from the fractionator is not available, it is sometimes possible to obtain a rough estimate of conversion by performing a material balance well downstream from the fractionator at a point such as the gas plant. A good material balance is typically difficult to achieve since it depends upon keeping numerous flows, temperatures and composition measurements accurate. Thus, a material balance of 105%–95% is typical and a material balance of 115%–85% is not uncommon. Also, the material balance is considerably delayed in time with respect to the time that the feed is provided to the reactor which makes it difficult to accurately maintain a desired conversion based on such a material balance.

It is thus an object of this invention to provide method and apparatus for maintaining a desired feed conversion for a CCU without the need for an analyzer to analyze the various products streams withdrawn from the fractionator and without the need for a material balance downstream from the fractionator.

In accordance with the present invention, method and apparatus are provided whereby the amount of the products removed from the fractionator which have a boiling point above the highest boiling point of the desired product is calculated based on internal reflux to vapor ratios at various points in the fractionator. Once this determination is made, the actual conversion is determined and a process variable for the reactor, such as the temperature in the reactor, is manipulated so as to maintain the actual conversion substantially equal to a desired conversion.

Other objects and advantages of the invention will be apparent from the foregoing brief description of the invention and the claims as well as the detailed description of the drawings in which:

The invention is illustrated and described in terms of a particular FCCU configuration. However, the invention is also applicable to other types of CCU's, such as thermoform catalytic cracking units, and to other FCCU configurations. The invention is also described in terms of an FCCU in which gas oil is utilized as a feedstock and the primary objective is to produce gasoline. However, other feedstocks may be utilized and the most desired product may be other than gasoline. The invention is also described in terms of supplying air to the regenerator to supply the oxygen required to burn off carbon from the spent catalyst. Air is generally the fluid utilized to supply oxygen to the regenerator but any suitable fluid containing free oxygen may be utilized if desired.

The invention is also described in terms of controlling the reaction temperature to maintain a desired conversion. However, the invention is also applicable to the control of other process variables.

Figure 1:
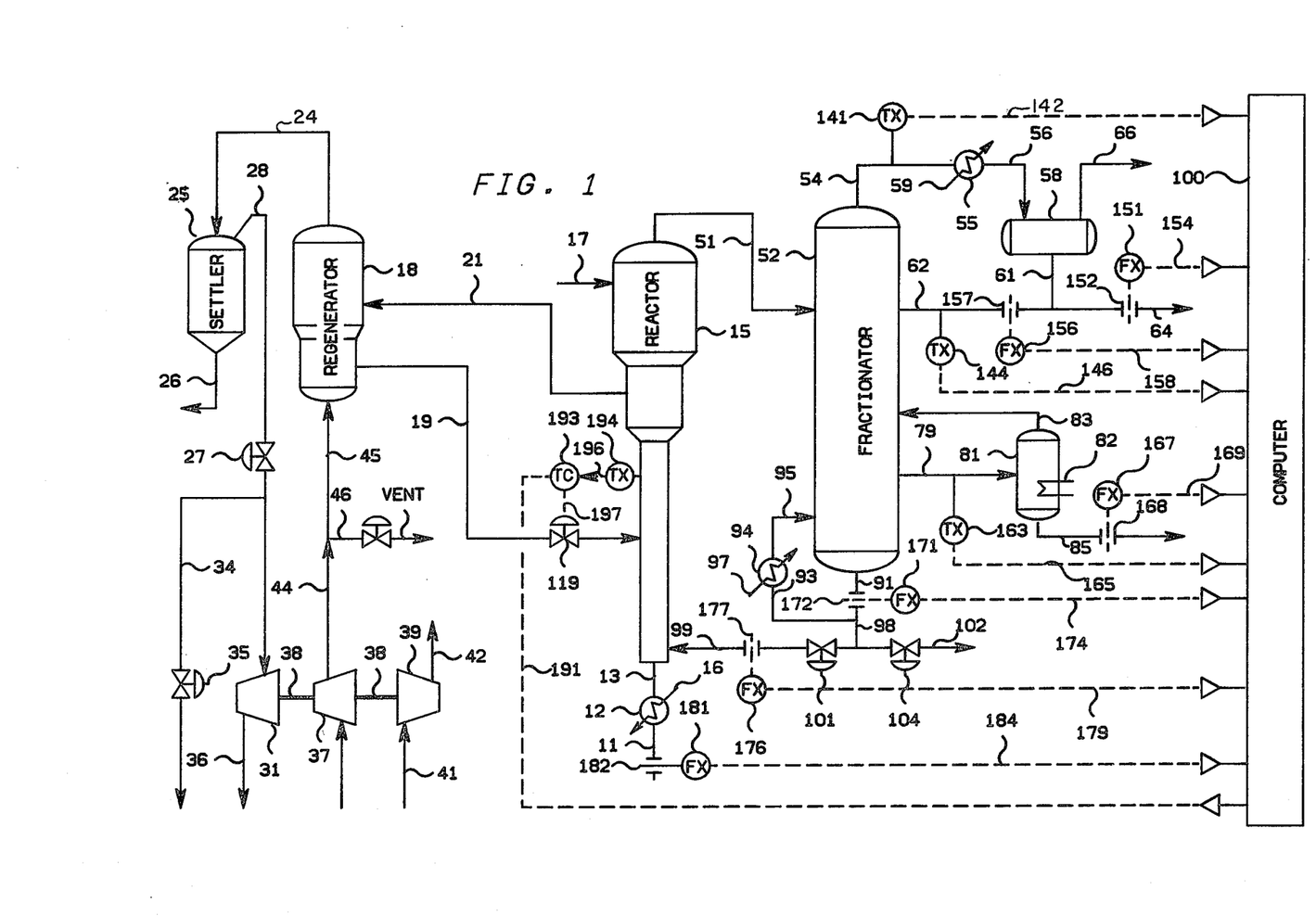
FIG. 1 is a diagrammatic illustration of an FCCU with an associated control system.

Only those portions of the control system for an FCCU necessary to illustrate the present invention are set forth in FIG. 1. A large amount of additional control equipment will be utilized to control the FCCU but these additional control elements have not been illustrated for the sake of clarity in illustrating the present invention. Additional control elements required for an FCCU are well known from the many years that FCCU's have been utilized.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control systems art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a gas oil feed is supplied through the combination of conduit means 11, heat exchanger 12 and conduit means 13 to the riser portion of the reactor 15. A heating fluid is supplied to the heat exchanger 12 through conduit means 16. Steam is supplied to the reactor 15 through conduit means 17.

A zeolite cracking catalyst is generally preferred for an FCCU but any suitable cracking catalyst may be utilized. Fresh catalyst is supplied from the catalyst regenerator 18 to the riser portion of the reactor 15 through conduit means 19. Spent catalyst is removed from the reactor 15 and is provided to the regenerator 18 through conduit means 21. Carbon is burned off of the spent catalyst in the regenerator 18 to produce the fresh catalyst which is provided through conduit means 19.

Hot flue gas is removed from the regenerator 18 and is provided through conduit means 24 to the settler 25. Fine particles are separated from the flue gas in the settler 25 and are removed through conduit means 26. Hot gases are removed from the settler 25 and are provided through the combination of conduit means 28, in which control valve 27 is operably located, and conduit means 29 to the expander 31. The hot gases flowing through conduit means 28 may be bypassed around the expander 31 through conduit means 34 in which control valve 35 is operably located. The hot gases flowing through conduit 29 are removed from the expander 31 through conduit means 36. The hot gases are utilized to provide a driving force for the air blower 37 which is operably coupled to the expander 31 by means of shaft 38 which also extends through the air blower 37 to the steam turbine 39. Steam is provided to the turbine 39 through conduit means 41 and is removed through conduit means 42.

Ideally, the expander 31 is utilized to provide as much of the driving force required by the air blower 37 as possible. The turbine 39 is utilized only to supplement the expander 31.

Air is provided from the air blower 37 through the combination of conduit means 44 and 45 to the regenerator 18. Air may be vented through conduit means 46.

The reaction product is removed from the reactor 15 and is provided through conduit means 51 to the fractionator 52. The reaction product flowing through conduit means 51 will generally be made up of light olefins, gasoline, cycle oil and components of the feed which were not cracked in the reactor 15.

An overhead stream is withdrawn from the fractionator 52 and is provided through conduit means 54, heat exchanger 55 and conduit means 56 to the overhead accumulator 58. A cooling fluid is provided to the heat exchanger 55 through conduit means 59. A first portion of the liquid in the overhead accumulator 58 is withdrawn and is provided through the combination of conduit means 61 and 62 as an external reflux to the fractionator 52. A second portion of the liquid in the overhead accumulator 58 is provided through the combination of conduit means 61 and 64 as the overhead product (primarily gasoline) from the fractionator 52.

Vapor in the overhead accumulator 58 is withdrawn through conduit means 66. These vapors would typically be compressed and provided to the primary absorber for an FCCU gas plant (not illustrated).

A sidedraw stream is removed from a lower portion of the fractionator 52 through conduit means 79. Other sidedraw streams may also be removed but the present invention can be fully illustrated and described in terms of withdrawing only one sidedraw stream which will be considered the cycle oil draw.

The sidedraw stream flowing through conduit means 79 is provided to the separator 81. A heating fluid flows to the separator 81 through conduit means 82. The separator 81 is utilized to separate some of the lighter components from the sidedraw stream flowing to conduit means 79. The separated lighter components are returned to the fractionator 52 through conduit means 83. A sidedraw product stream (primarily cycle oil) is withdrawn from the separator 81 through conduit means 85.

A bottoms material, which is generally referred to as the slurry, is withdrawn from the fractionator 52 through conduit means 91. A portion of the thus withdrawn bottoms material is recycled to the fractionator 52 through the combination of conduit means 93, heat exchanger 94 and conduit means 95. A cooling fluid is provided to the heat exchanger 94 through conduit means 97. A portion of the bottoms product flowing through conduit means 91 is also provided through conduit means 98 and conduit means 99, in which control valve 101 is operably located, to the riser portion of the reactor 15. It is noted that, in general, it is desirable to minimize the recycle of bottoms material to the riser reactor since the bottoms material flowing through conduit means 98 is very difficult to crack and thus provision is made for withdrawing the bottoms product through conduit means 102, in which control valve 104 is operably located, if it is not desired to increase the recycle to the fractionator 52 or reactor 15.

The FCCU described to this point is a conventional FCCU. Conventional equipment not required for an explanation of the invention has not been illustrated and described. Also, many of the process streams illustrated would be controlled by well known techniques but since these particular control configurations play no part in the explanation of the present invention, the standard control configurations are not described for the sake of simplicity.

A detailed description of the unique control system of the present invention which maintains a desired conversion for the FCCU follows. The control system will be described in terms of the process measurements required and the process control signal generated and then in terms of the manner in which the process control signal is generated in response to the process measurements.

Temperature transducer 141 in combination with a temperature measuring device such as a thermocouple, which is operably located in conduit means 54, provides an output signal 142 which is representative of the temperature of the overhead stream flowing through conduit means 54. Signal 142 is provided from the temperature transducer 141 as an input to computer means 100. It is again noted that transducing of signal 142 would be required but such transducing has not been illustrated for the sake of simplicity.

Temperature transducer 144 in combination with a temperature measuring device such as a thermocouple, which is operably located in conduit means 62, provides an output signal 146 which is representative of the temperature of the upper external reflux flowing through conduit means 62. Signal 146 is provided from the temperature transducer 144 as an input to computer means 100.

Flow transducer 151 in combination with the flow sensor 152, which is operably located in conduit means 64, provides an output signal 154 which is representative of the flow rate of the overhead product stream flowing through conduit means 64. Signal 154 is provided from the flow transducer 151 as an input to computer means 100.

Flow transducer 156 in combination with the flow sensor 157, which is operably located in conduit means 62, provides an output signal 158 which is representative of the flow rate of the upper external reflux flowing through conduit means 62. Signal 158 is provided as an input to computer means 100.

Temperature transducer 163 in combination with a temperature measuring device such as a thermocouple, which is operably located in conduit means 79, provides an output signal 165 which is representative of the temperature of the side draw stream flowing through conduit means 79. Signal 165 is provided from the temperature transducer 163 as an input to computer means 100.

Flow transducer 167 in combination with a flow sensor 168, which is operably located in conduit means 85, provides an output signal 169 which is representative of the flow rate of the cycle oil product stream flowing through conduit means 85. Signal 169 is provided from the flow transducer 167 as an input to computer means 100.

Flow transducer 17 in combination with flow sensor 172, which is operably located in conduit means 91, provides an output signal 174 which is representative of the flow rate of the bottoms product withdrawn through conduit means 91. Signal 174 is provided from the flow transducer 171 as an input to computer means 100.

Flow transducer 176 in combination with flow sensor 177, which is operably located in conduit means 99, provides an output signal 179 which is representative of the flow rate of the bottoms product recycled to the reactor 15 through conduit means 99. Signal 179 is provided from the flow transducer 176 as an input to computer means 100.

Flow transducer 181 in combination with flow sensor 182, which is operably located in conduit means 11, provides an output signal 184 which is representative of the flow rate of the fresh feed flowing through conduit means 11. Signal 184 is provided from the flow transducer 181 as an input to computer means 100.

In response to the described process variable inputs and certain set points which will be described hereinafter, computer means 100 calculates the reaction temperature in the riser portion of the reactor 15 required to maintain the actual conversion of the total feed to the reactor 15 to gasoline substantially equal to a desired conversion. Signal 191, which is representative of this desired temperature, is provided from computer means 100 as a set point input to the temperature controller 193. The temperature transducer 194 in combination with a temperature measuring device such as a thermocouple, which is operably located in the riser portion of reactor 15 provides an output signal 196 which is representative of the actual temperature in the riser portion of the reactor 15 after the feedstock and catalyst have been combined (reaction temperature). Signal 196 is provided from the temperature transducer 194 as the process variable input to the temperature controller 193. In response to signals 191 and 196, the temperature controller 193 establishes an output signal 197 which is responsive to the difference between signals 191 and 196. Signal 197 is scaled so as to be representative of the flow rate of the catalyst flowing through conduit means 19 required to maintain a desired reaction temperature in the riser portion of the reactor 15. Signal 197 is provided from the temperature controller 193 as a control signal to the control valve 119. The control valve 119 is manipulated in response to signal 197 to thereby maintain a desired flow rate of the catalyst flowing through conduit means 19 which results in the maintenance of a desired conversion.

Figure 2:
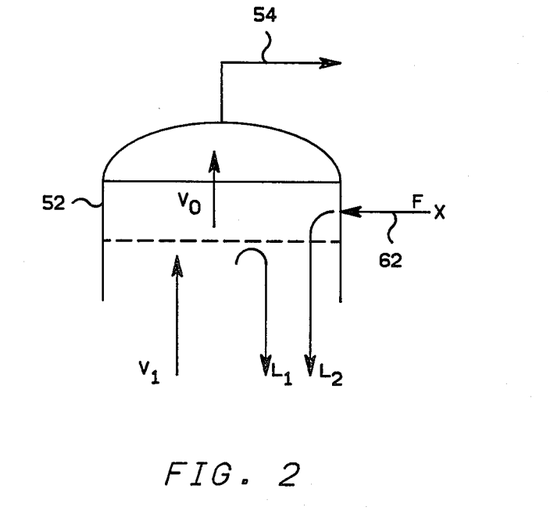
FIG. 2 is a diagrammatic illustration of the various flows of vapor and liquid at the top of the fractional distillation column illustrated in FIG. 1.
Figure 3:
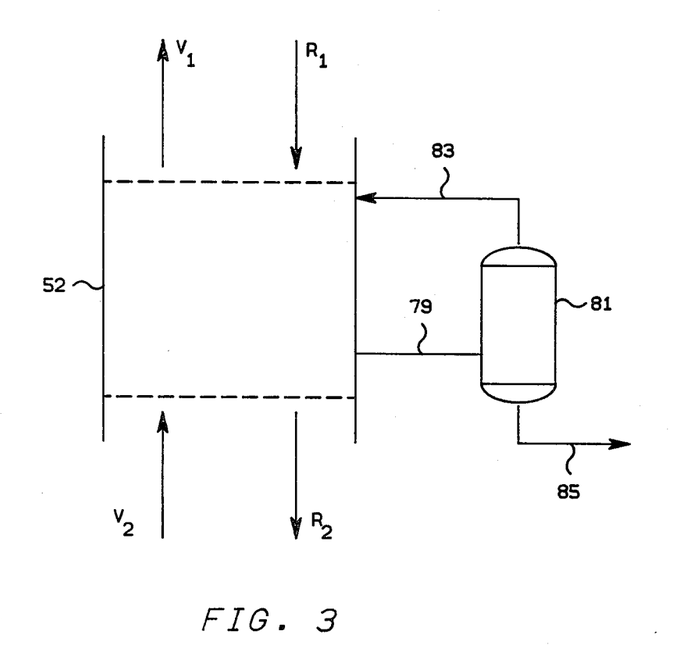
FIG. 3 is a diagrammatic illustration of the various flows of liquid and vapor in the central portion of the fractional distillation column illustrated in FIG. 1.

FIGS. 2 and 3 will be utilized to illustrate the manner in which the actual internal reflux to vapor ratio in the upper portion and intermediate portion of the fractional distillation column 52 are calculated. These ratios are utilized to determine the product distribution for the fractional distillation column 52. All flow rates discussed are mass flow rates. Conversion of a measured volumetric flow rate to a mass flow rate is well known. In general, the measured volume flow rate of a fluid is multiplied by the density of the fluid to give the mass flow rate of the fluid. The density of the various fluids associated with any particular fractional distillation process will generally be well known but may be calculated from measured data if desired. Since this particular conversion is well known, the actual conversion is not described for each fluid stream hereinafter.

Referring now to FIG. 2, the dashed line is preferably the top tray of the fractional distillation column 52. A vapor illustrated as $V_1$ flows up the fractional distillation column. A portion of the vapor flowing up the fractional distillation column 52 is cooled when contacted with the upper external reflux flowing through conduit means 62 and is condensed. The portion of the vapor streams flowing up the fractional distillation column 52 that condenses is illustrated as $L_1$. The upper external relux flowing down the fractional distillation column is illustrated as $L_2$. The combination of $L_1$ and $L_2$ is equal to the internal reflux flow rate immediately below the top tray of the fractional distillation column 52. The portion of the vapor flowing up the fractional distilation column which is not condensed is illustrated as $V_0$. This vapor flows through conduit means 54. A material balance for the upper portion of the fractional distillation column 52 illustrated in FIG. 1 gives $$V_1 - V_o = L_1 + L_2 - F_x. \tag{1}$$

Rearranging Equation (1) and setting $L_1 + L_2$ equal to $R_1$, where $R_1$ is representative of the internal reflux flow rate in the upper portion of the fractional distillation column 52, gives $$V_1 = V_o + R_1 - F_x. \tag{2}$$

A heat balance for the upper portion of the fractional distillation column 52 illustrated in FIG. 2 gives $$R_1 = F_x(1 + K\Delta T) \tag{3}$$

where $\Delta T$ is the difference between the temperature of the vapor flowing through conduit means 54 and the temperature of the external reflux flowing through conduit means 62 and K is equal to the specific heat of the external reflux divided by the heat of vaporization for the external reflux. Using the nomenclature of FIG. 1, $\Delta T$ is equal to the difference between the temperature represented by signal 142 and a temperature represented by signal 146. $F_x$ is equal to the flow rate represented by signal 158 converted to a mass flow rate.

Calculation of the specific heat and heat of vaporization of a fluid such as the external reflux flowing through conduit means 62 is well known in the art. Reference materials such as *The Chemical Engineer's Handbook*, 4th and 5th edition, McGaw-Hill, provide calculations and tables for the specific heat and heat of vaporization of the components which would make up the external reflux flowing through conduit means 62.

Since $F_x$, K and $\Delta T$ are known in Equation (3), Equation (3) can be solved to derive the actual internal reflux in the upper portion of the fractional distillation column 52. $R_1$ can then be substituted into Equation (2) and since $V_o$ can be determined from the combination of the flow rate of the upper external reflux flowing through conduit means 62 and the overhead product flowing through conduit means 64, Equation (2) can be solved for the actual mass flow rate of the vapor at the top tray of the fractional distillation column 52. A ratio of the solution to Equations (2) and (3) gives the actual internal reflux to vapor ratio at the top tray of the fractional distillation column 11.

Referring now to FIG. 3, the boundaries for the material and heat balance are chosen so as to be able to ignore the effect of the reflux returning through conduit means 83 except to the extent that that reflux affects $V_2$ or $R_2$ illustrated in FIG. 3. $V_1$ and $R_1$ are as previously described with reference to FIG. 2. $V_2$ is the vapor flow rate at a point immediately below the point from which the side draw stream flowing through conduit means 79 is withdrawn and in like manner $R_2$ is the liquid flow rate at that same point. A mass balance for FIG. 3 gives $$V_2 = F_D + V_1 + R_2 - R_1 \tag{4}$$

An energy balance for FIG. 3 gives $$R_2 = \left(\frac{h_1}{h_1 - C_p\Delta T}\right) R_1 - F_D \tag{5}$$

where $\Delta T$ is equal to the difference between the temperature of the liquid above the point where the side draw stream flowing through conduit means 79 is withdrawn and the temperature of the side draw stream flowing through conduit means 79. The temperature above the point where the side draw stream flowing through conduit means 79 is withdrawn is approximately equal to the temperature of the overhead stream flowing through conduit means 54. Thus, utilizing the nomenclature of FIG. 1, $\Delta T$ of Equation (5) is representative of the difference between the temperature represented by signal 142 and the temperature represented by signal 165. In Equation (5) $h_1$ is representative of the heat of vaporization of the side draw stream flowing through conduit means 79 and $C_p$ is representative of the specific heat of the side draw stream flowing through conduit means 79.

All of the elements of Equation (5) are known except for $R_2$ and thus Equation (5) can be solved for the actual flow rate of the internal reflux at the point immediately below the point where the side draw stream flowing through conduit means 79 is withdrawn from the fractional distillation column 52. $R_2$ can then be substituted into Equation (4) and since $V_1$ is known from Equation (2) and $R_1$ is known from Equation (3), Equation (4) may be solved for $V_2$. The ratio of the results of Equation (4) and (5) gives the internal reflux to vapor ratio at the point immediately below the point where the side draw stream flowing through conduit means 79 is withdrawn from the fractional distillation column 52.

Figure 4:
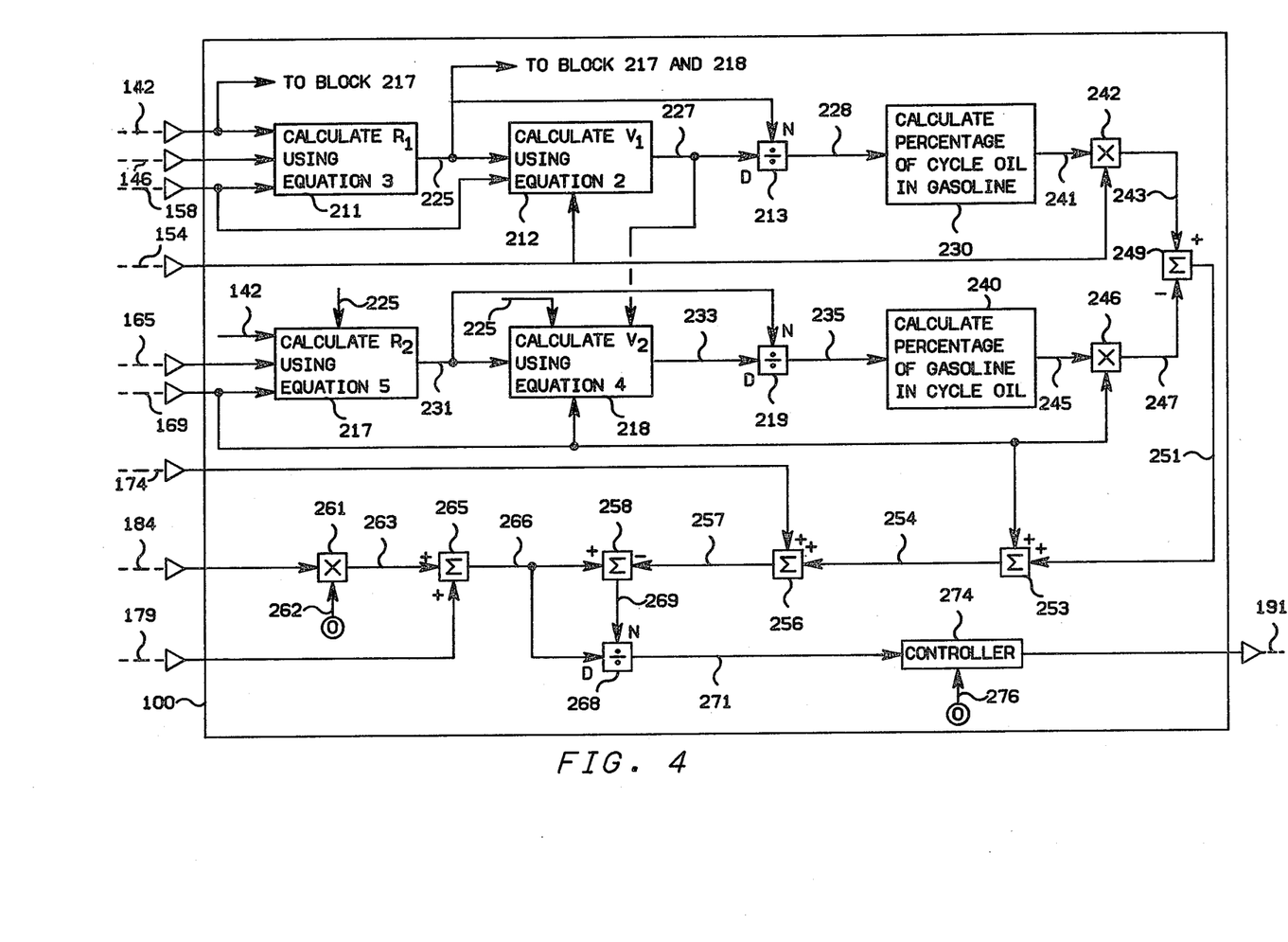
FIG. 4 is a logic diagram of the preferred computer logic utilized to implement the desired control functions.

A simplified flow diagram for the computer logic utilized to calculate the set point signal 191 is illustrated in FIG. 4. Conversion of volume flow rates to mass flow rates is not illustrated but would be utilized for each measured flow rate. Referring to FIG. 4, signal 142, which is representative of the temperature of the overhead stream flowing through conduit means 54 is provided as an input to block 211 and is also provided as an input to block 217. Signal 146, which is representative of the temperature of the external reflux flowing through conduit means 62 is also provided to block 211. Signal 158, which is representative of the flow rate of the external reflux flowing through conduit means 62 is provided as an input to block 211 and is also provided as an input to block 212. In response to the described input signals, the flow rate ($R_1$) of the internal reflux in the upper portion of the fractional distillation column 52 is calculated utilizing Equation (3). Signal 225, which is representative of the flow rate $R_1$, is provided from block 211 to the numerator input of dividing block 213 and as an input to blocks 212, 217 and 218. Block 212 is also provided with signal 154 which is representative of the flow rate of the overhead product stream flowing through conduit means 64. In response to the described inputs, the flow rate ($V_1$) of the vapor at the point immediately below where the upper external reflux flowing through conduit means 62 is returned to the fractional distillation column 52 is calculated utilizing Equation (2). Signal 227, which is representative of $V_1$, is provided from block 212 to the denominator input of the dividing block 213 and is also provided as an input to block 218. Signal 225 is divided by signal 227 in block 213 to establish signal 228 which is representative of the actual internal reflux to vapor ratio in the upper portion of the fractional distillation column 52. Signal 228 is provided from the dividing block 213 as an input to block 230.

It is well known that, in any fractional distillation process, the separation of components will never be absolute. Thus, the overhead product stream flowing through conduit means 64 will contain some cycle oil and the sidedraw product stream flowing through conduit means 85 will contain some gasoline. Signal 228 is utilized to calculate the percentage of the overhead product stream flowing through conduit means 64 which is cycle oil. For the purposes of this description, this will be calculated based on the percentage of the overhead product stream which has a boiling point above 430° F.

Figure 5:
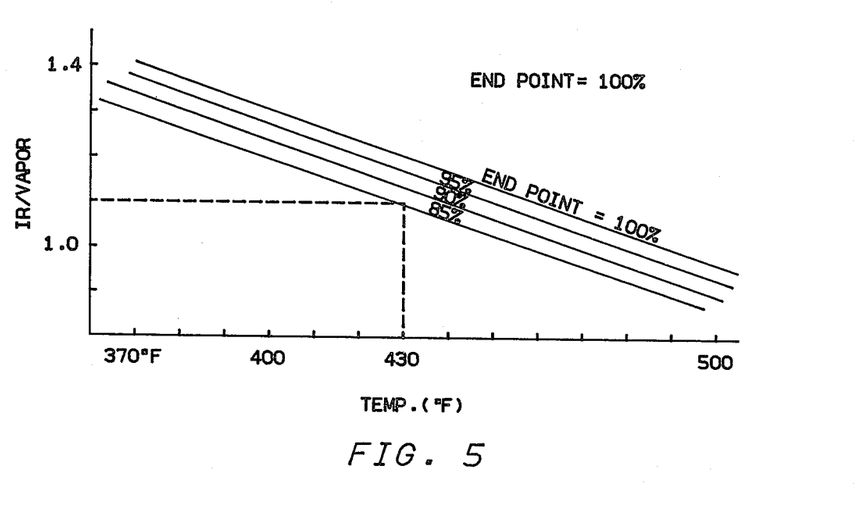
FIG. 5 is a typical plot of the internal reflux to vapor ratio as a function of temperature for the overhead product stream.

FIG. 5 will be utilized to illustrate the manner in which this percentage is calculated. Referring to FIG. 5, there is illustrated a plot of the internal reflux to vapor ratio as a function of temperature for the overhead product stream. A plurality of straight lines are plotted which are labelled end point, 95%, 90% and 85% point. The straight line labelled end point is derived by actual measurements of end points for the overhead product stream for a known internal reflux to vapor ratio. In like manner, the 95%, 90% line and 85% line are derived by measurements of the actual 95% cut point, 90% cut point or 85% cut point for the overhead product stream for a known internal reflux to vapor ratio. Once these lines are established, the percentage of the overhead product stream flowing through conduit means 64 which has a boiling point above 430° F. may be calculated by determining the cut point at 430° F. as is illustrated in FIG. 5. As an example, for an internal reflux to vapor ratio of 1.1, the cut point at 430° F. is about 87% and thus about 13% of the overhead product stream flowing through conduit means 64 has a boiling point above 430° F. Signal 241, which is representative of the percentage of the overhead product stream flowing through conduit means 64 which has a boiling point above 430° F. (cycle oil) is provided from block 230 to the multiplying block 242.

Signal 241 is multiplied by signal 154, which is representative of the flow rate of the overhead product stream through conduit means 64, to establish signal 243 which is representative of the flow rate of cycle oil (above 430° F.) through the conduit means 64. Signal 243 is provided from the multiplying block 242 to the summing block 249.

Signal 165, which is representative of the temperature of the sidedraw stream flowing through conduit means 79, is provided as an input to block 217. Signal 169, which is representative of the flow rate of the sidedraw product stream flowing through conduit means 85, is provided as an input to block 217 and is also provided as an input to blocks 218, 246 and 253. In response to the described inputs, the flow rate ($R_2$) of the internal reflux at the point immediately below the point where the sidedraw stream flowing through conduit means 79 is withdrawn from the fractional distillation column 52 is calculated utilizing Equation 5. Signal 231, which is representative of $R_2$, is provided from block 217 as an input to block 218 and is also provided to the numerator input of the dividing block 219.

In response to the described inputs, the flow rate ($V_2$) of the vapor at the point immediately below the point where the sidedraw stream flowing through conduit means 79 is withdrawn from the fractional distillation column 52 is calculated in block 218 utilizing Equation 4. Signal 233, which is representative of $V_2$, is provided from block 218 to the denominator input of the dividing block 219. Signal 231 is divided by signal 233 to establish signal 235 which is representative of the actual internal reflux to vapor ratio at the point immediately below the point where the sidedraw stream flowing through conduit means 79 is withdrawn from the fractional distillation column 52. Signal 235 is provided from the dividing block 219 as an input to block 240.

Figure 6:
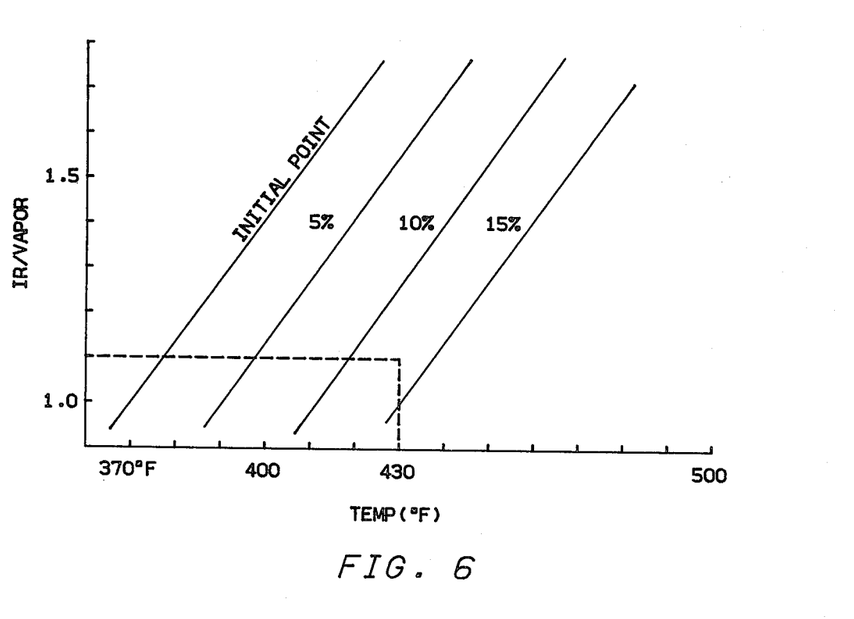
FIG. 6 is a typical plot of the internal reflux to vapor ratio as a function of temperature for the sidedraw product stream.

The percentage of the sidedraw product stream flowing through conduit means 85 which has a boiling point below 430° F. (gasoline) is determined in the same manner as previously described for determining the percentage of cycle oil in the overhead product stream flowing through conduit 64 except that an initial point line and low cut point lines are used. Referring now to FIG. 6, in which a plot of the internal reflux to vapor ratio as a function of temperature for the sidedraw product stream is illustrated, the percentage of the sidedraw product stream which is gasoline can be determined based on the actual internal reflux to vapor ratio. Again, assuming that cycle oil boils above 430° F., for the plot illustrated in FIG. 6, if the internal reflux to vapor ratio is 1.1, the cut point is about 13% and thus about 13% of the sidedraw product stream flowing through conduit 85 is gasoline. Signal 245, which is representative of the percentage of the sidedraw product stream flowing through conduit means 85 which is gasoline, is provided from block 240 as an input to the multiplying block 246.

Signal 245 is multiplied by signal 169, which is representative of the actual flow rate of the sidedraw product stream flowing through conduit means 85, to establish signal 247 which is representative of the flow rate of gasoline through conduit means 85. Signal 247 is provided from the multiplying block 246 to subtrahend of the summing block 249.

Signal 247 is subtracted from signal 243 to establish signal 251 which is representative of the difference between the amount of cycle oil contained in the gasoline stream and the amount of gasoline contained in cycle oil stream. Essentially, the fact that a perfect separation is not possible is compensated for. Signal 251 is provided from the summing block 249 as an input to the summing block 253.

Signal 251 is summed with signal 169 to establish 254 which is representative of the flow rate of cycle oil (heavier than 430° F.) through conduit means 64 and 85. Signal 254 is provided from the summing block 253 as an input to the summing block 256.

Signal 174, which is representative of the flow rate of the bottoms stream through conduit means 91, is provided as a second input to the summing block 256. Signal 174 and 254 are summed to establish signal 257 which is representative of the flow rate of all products removed from the fractional distillation column 52 which have a boiling point above 430° F. Signal 257 is provided from the summing block 256 to the minuend input of the summing block 258.

Signal 184, which is representative of the flow rate of the fresh feed flowing through conduit means 11, is provided as an input to the multiplying block 261. Generally, there will be some gasoline or lighter materials in the feedstream flowing through conduit means 11. These materials are compensated for by multiplying signal 184 by signal 262 which is representative of the percentage of the feedstream flowing through conduit means 11 which has a boiling point above 430° F. This percentage will generally be known for the feed being provided to an FCCU. Signal 263, which is representative of the flow rate of the feed flowing through conduit means 11 which has a boiling point above 430° F., is provided from the multiplying block 261 as an input to the summing block 265.

Signal 179, which is representative of the flow rate of the slurry recycled through conduit means 99 to the reactor 15, is provided as a second input to the summing block 265. Signals 263 and 179 are summed to establish signal 266 which is representative of the total flow rate of the feed to the reactor 15 which has a boiling point above 430° F. Signal 266 is provided from the summing block 265 to the minuend input of the summing block 258 and to the denominator input of the dividing block 268.

Signal 257 is subtracted from signal 266 to establish signal 269 which is representative of Total Feed-Total Secondary Product as previously defined. Signal 269 is provided from the summing block to the numerator input of the dividing block 268.

Signal 269 is divided by signal 266 to establish signal 271 which is representative of the conversion for the FCCU illustrated in FIG. 1. Essentially, as has been previously stated, signal 271 is representative of the percentage of the total feed having a boiling point above 430° F. which is converted to a product having a boiling point below 430° F. Signal 271 is provided from the dividing block 268 as an input to the controller block 274. If desired, signal 271 can be converted to a percentage.

Signal 276, which is representative of the desired conversion, is provided as a set point input to the controller block 274. In response to signals 271 and 276, the controller block 274 establishes an output signal 191 which is responsive to the difference between signals 271 and 276. Signal 191 is scaled so as to be representative of the reaction temperature in the riser portion of the reactor 15 required to maintain the actual conversion, as represented by signal 271, substantially equal to the desired conversion represented by signal 276. Signal 191 is provided as the control output from computer means 100 and is utilized as has been previously described.

In summary, the flow rate of products from the fractional distillation column 52 which have a boiling point above 430° F. (generally considered as gasoline or lighter) is determined based on the internal reflux to vapor ratios at particular points in the fractional distillation column 52. Also, the flow rate of the feed to the reactor 15 which has a boiling point above 430° F. is determined. Based on these two determinations, the actual conversion is determined and the reactor 15 is controlled so as to maintain the actual conversion substantially equal to a desired conversion.

The invention has been described in terms of a preferred embodiment as illustrated in FIGS. 1–6. Specific control components which can be used in the practice of the invention as illustrated in FIG. 1 such as temperature transducers 141, 144, 163 and 194; flow transducers 156, 151, 167, 171, 176 and 181; flow sensors 158, 152, 168, 172, 177 and 182; and temperature controller 193 and the many control valves illustrated are each well known, commercially available control components such as are illustrated and described at length in *Perry's Chemical Engineer's Handbook*, 4th Edition, Chapter 22, McGraw-Hill.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a reactor;
   a fractional distillation column;
   means for supplying a feed to said reactor;
   means for removing the products produced by the cracking of said feed from said reactor and for supply the thus removed products as a feed to said fractional distillation column;
   cooling means;
   an accumulator;
   means for withdrawing an overhead stream from said fractional distillation column and for supplying the thus withdrawn overhead stream through said cooling means to said accumulator;

means for withdrawing a liquid stream from said overhead accumulator, for returning a first portion of the thus withdrawn liquid stream to an upper portion of said fractional distillation column as an upper external reflux and for withdrawing a second portion of the thus withdrawn liquid stream as an overhead product stream;

means for withdrawing a sidedraw stream from an intermediate portion of said fractional distillation column, wherein at least a portion of said sidedraw stream is utilized to provide a side draw product stream;

means for withdrawing a bottoms product stream from a lower portion of said fractional distillation column, wherein a portion of the thus withdrawn bottoms product stream may be recycled to said reactor;

means for establishing a first signal representative of the actual internal reflux to vapor ratio in said upper portion of said fractional distillation column;

means for establishing a second signal representative of the actual internal reflux to vapor ratio in said intermediate portion of said fractional distillation column;

means for establishing a third signal representative of the actual flow rate of product removed from said fractional distillation column in said overhead product stream and said sidedraw product stream which has a boiling point above a specified boiling point in response to said first and second signals;

means for establishing a fourth signal representative of the actual flow rate of said bottoms product stream;

means for summing said third signal and said fourth signal to establish a fifth signal representative of the total flow rate of product withdrawn from said fractional distillation column which has a boiling point above said specified boiling point;

means for establishing a sixth signal representative of the flow rate of the portion of said feedstream to said reactor which has a boiling point above said specified boiling point;

means for establishing a seventh signal representative of the flow rate of any portion of said bottoms product stream recycled to said reactor;

means for summing said sixth signal and said seventh signal to establish an eighth signal representative of the total flow rate of feed to said reactor which has a boiling point above said specified boiling point;

means for establishing a ninth signal representative of the amount of the feed flowing to said reactor which has a boiling point above said specified boiling point which is converted to a product having a boiling point below said specified boiling point (Conversion) in response to said fifth and eighth signals;

means for establishing a tenth signal representative of a desired Conversion;

means for comparing said ninth signal and said tenth signal and for establishing a eleventh signal which is responsive to the difference between said ninth signal and said tenth signal; and means for manipulating a process variable associated with said reactor in response to said eleventh signal to thereby maintain the actual Conversion represented by said ninth signal substantially equal to the desired Conversion represented by said tenth signal.

2. Apparatus in accordance with claim 1 wherein said means for establishing said first signal comprises means for calculating the value of said first signal based on a material balance and energy balance in the upper portion of said fractional distillation column and wherein said means for establishing said second signal comprises means for calculating the value of said second signal based on a material balance and energy balance for said intermediate portion of said fractional distillation column.

3. Apparatus in accordance with claim 1 wherein said means for establishing said third signal in response to said first and second signals comprises:

means for establishing a twelfth signal representative of the percentage of said overhead product stream which has a boiling point above said specified boiling point in response to said first signal;

means for establishing a thirteenth signal representative of the actual flow rate of said overhead product stream;

means for multiplying said twelfth signal and said thirteenth signal to establish a fourteenth signal representative of the actual flow rate of the portion of said overhead product stream which has a boiling point above said specified boiling point;

means for establishing a fifteenth signal representative of the percentage of said sidedraw product stream which has a boiling point below said specified boiling point in response to said second signal;

means for establishing a sixteenth signal representative of the actual flow rate of said sidedraw product stream;

means for multiplying said fifteenth signal and said sixteenth signal to establish a seventeenth signal which is representative of the actual flow rate of the portion of said sidedraw product stream which has a boiling point below said specified boiling point;

means for subtracting said seventeenth signal from said fourteenth signal to establish an eighteenth signal; and means for adding said eighteenth signal and said sixteenth signal to establish said third signal.

4. Apparatus in accordance with claim 2 wherein said means for establishing said twelfth signal in response to said first signal comprises means for calculating the value of said twelfth signal based on a plot of the internal reflux to vapor ratio in said upper portion of said fractional distillation column as a function of the temperature of said overhead product stream and wherein said means for establishing said fifteenth signal in response to said second signal comprises means for calculating the value of said fifteenth signal based on a plot of the internal reflux to vapor ratio in said intermediate portion of said fractional distillation column as a function of the temperature of said sidedraw product stream.

5. Apparatus in accordance with claim 1 wherein said means for establishing said sixth signal comprises:

means for establishing a twelfth signal representative of the actual flow rate of said feed stream;

means for establishing a thirteenth signal representative of the percentage of said feedstream which has a boiling point above said specified boiling point; and means for multiplying said twelfth signal by said thirteenth signal to establish said sixth signal.

6. Apparatus in accordance with claim 1 wherein said means for establishing said ninth signal in response to said fifth signal and said eighth signal comprises:
  means for subtracting said fifth signal from said eighth signal to establish a twelfth signal; and
  means for dividing said twelfth signal by said eighth signal to establish said ninth signal.

7. Apparatus in accordance with claim 1 additionally comprising:
  a catalyst regenerator;
  means for supplying a regenerated cracking catalyst from said catalyst regenerator to said reactor; and
  means for removing cracking catalyst contaminated by carbon from said reactor and for supplying the thus removed cracking catalyst to said catalyst regenerator.

8. Apparatus in accordance with claim 7 wherein said eleventh signal is scaled so as to be representative of the reaction temperature in said reactor required to maintain the actual Conversion represented by said ninth signal substantially equal to the desired Conversion represented by said tenth signal and wherein said means for manipulating a process variable associated with said reactor in response to said eleventh signal comprises:
  means for establishing a twelfth signal representative of the actual reaction temperature in said reactor;
  means for comparing said eleventh signal and said twelfth signal and for establishing a thirteenth signal which is responsive to the difference between said eleventh signal and said twelfth signal, wherein said thirteenth signal is scaled so as to be representative of the flow rate of said regenerated cracking catalyst from said catalyst regenerator to said reactor required to maintain the actual reaction temperature in said reactor substantially equal to the desired reaction temperature represented by said eleventh signal; and
  means for manipulating the flow rate of said regenerated cracking catalyst from said catalyst regenerator to said reactor in response to said thirteenth signal.

9. A method for controlling a catalytic cracking unit, wherein a feed provided to a reactor is contacted with a cracking catalyst in said reactor to produce a product stream which is provided from said reactor to a fractional distillation column, wherein an overhead stream is withdrawn from said fractional distillation column and at least partially condensed with a first portion of the thus produced liquid being provided to an upper portion of said fractional distillation column as an upper external reflux and a second portion of the thus produced liquid being withdrawn as an overhead product stream, wherein a sidedraw stream is withdrawn from an intermediate portion of said fractional distillation column with at least a portion of said sidedraw stream being utilized to provide a sidedraw product stream, wherein a bottoms product stream is withdrawn from a lower portion of said fractional distillation column and wherein a portion of the thus withdrawn bottoms product stream may be recycled to said reactor, said method comprising the steps of:
  establishing a first signal representative of the actual internal reflux to vapor ratio in said upper portion of said fractional distillation column;
  establishing a second signal representative of the actual internal reflux to vapor ratio in said intermediate portion of said fractional distillation column;
  establishing a third signal representative of the actual flow rate of product removed from said fractional distillation column in said overhead product stream and said sidedraw product stream which has a boiling point above a specified boiling point in response to said first and second signals;
  establishing a fourth signal representative of the actual flow rate of said bottoms product stream;
  summing said third signal and said fourth signal to establish a fifth signal representative of the total flow rate of product withdrawn from said fractional distillation column which has a boiling point above said specified boiling point;
  establishing a sixth signal representative of the flow rate of the portion of said feedstream to said reactor which has a boiling point above said specified boiling point;
  establishing a seventh signal representative of the flow rate of any portion of said bottoms product stream recycled to said reactor;
  summing said sixth signal and said seventh signal to establish an eighth signal representative of the total flow rate of feed to said reactor which has a boiling point above said specified boiling point;
  establishing a ninth signal representative of the amount of the feed flowing to said reactor which has a boiling point above said specified boiling point which is converted to a product having a boiling point below said specified boiling point (Conversion) in response to said fifth and eighth signals;
  establishing a tenth signal representative of a desired Conversion;
  comparing said ninth signal and said tenth signal and establishing a eleventh signal which is responsive to the difference between said ninth signal and said tenth signal; and
  manipulating a process variable associated with said reactor in response to said eleventh signal to thereby maintain the actual Conversion represented by said ninth signal substantially equal to the desired Conversion represented by said tenth signal.

10. A method in accordance with claim 9 wherein said step of establishing said first signal comprises calculating the value of said first signal based on a material balance and energy balance in said upper portion of said fractional distillation column and wherein said step of establishing said second signal comprises calculating the value of said second signal based on a material balance and energy balance for said intermediate portion of said fractional distillation column.

11. A method in accordance with claim 9 wherein said step of establishing said third signal in response to said first and second signals comprises:
  establishing a twelfth signal representative of the percentage of said overhead product stream which has a boiling point above said specified boiling point in response to said first signal;
  establishing a thirteenth signal representative of the actual flow rate of said overhead product stream;
  multiplying said twelfth signal and said thirteenth signal to establish a fourteenth signal representative of the actual flow rate of the portion of said overhead product stream which has a boiling point above said specified boiling point;
  establishing a fifteenth signal representative of the percentage of said sidedraw product stream which has a boiling point below said specified boiling point in response to said second signal;

establishing a sixteenth signal representative of the actual flow rate of said sidedraw product stream;

multiplying said fifteenth signal and said sixteenth signal to establish a seventeenth signal which is representative of the actual flow rate of the portion of said sidedraw product stream which has a boiling point below said specified boiling point;

subtracting said seventeenth signal from said fourteenth signal to establish an eighteenth signal; and adding said eighteenth signal and said sixteenth signal to establish said third signal.

12. A method in accordance with claim 11 wherein said step of establishing said twelfth signal in response to said first signal comprises calculating the value of said twelfth signal based on a plot of the internal reflux to vapor ratio in said upper portion of said fractional distillation column as a function of the temperature of said overhead product stream and wherein said step of establishing said fifteenth signal in response to said second signal comprises calculating the value of said fifteenth signal based on a plot of the internal reflux to vapor ratio in said intermediate portion of said fractional distillation column as a function of the temperature of said sidedraw product stream.

13. A method in accordance with claim 9 wherein said step of establishing said sixth signal comprises:

establishing a twelfth signal representative of the actual flow rate of said feed stream;

adding said eighteenth signal and said sixteenth signal to establish said third signal;

establishing a thirteenth signal representative of the percentage of said feedstream which has a boiling point above said specified boiling point; and multiplying said twelfth signal by said thirteenth signal to establish said sixth signal.

14. A method in accordance with claim 9 wherein said step of establishing said ninth signal in response to said fifth signal and said eighth signal comprises:

subtracting said fifth signal from said eighth signal to establish a twelfth signal; and dividing said twelfth signal by said eighth signal to establish said ninth signal.

15. A method in accordance with claim 9 additionally comprising the steps of:

supplying a regenerated cracking catalyst from a catalyst regenerator to said reactor; and removing cracking catalyst contaminated by carbon from said reactor and supplying the thus removed cracking catalyst to said catalyst regenerator.

16. A method in accordance with claim 15 wherein said eleventh signal is scaled so as to be representative of the reaction temperature in said reactor required to maintain the actual Conversion represented by said ninth signal substantially equal to the desired Conversion represented by said tenth signal and wherein said step of manipulating a process variable associated with said reactor in response to said eleventh signal comprises:

establishing a twelfth signal representative of the actual reaction temperature in said reactor;

comparing said eleventh signal and said twelfth signal and establishing a thirteenth signal which is responsive to the difference between said eleventh signal and said twelfth signal, wherein said thirteenth signal is scaled so as to be representative of the flow rate of said regenerated cracking catalyst from said catalyst regenerator to said reactor required to maintain the actual reaction temperature in said reactor substantially equal to the desired reaction temperature represented by said eleventh signal; and manipulating the flow rate of said regenerated cracking catalyst from said catalyst regenerator to said reactor in response to said thirteenth signal.

* * * * *